(12) United States Patent
Lutz

(10) Patent No.: US 8,364,543 B2
(45) Date of Patent: Jan. 29, 2013

(54) WEIGHT DETECTION FOR CASHIER CHECKOUT TERMINALS

(75) Inventor: Dusty Lutz, Dacula, GA (US)

(73) Assignee: NCR Corporation, Duluth, GA (US)

( * ) Notice: Subject to any disclaimer, the term of this patent is extended or adjusted under 35 U.S.C. 154(b) by 243 days.

(21) Appl. No.: 12/655,267

(22) Filed: Dec. 28, 2009

(65) Prior Publication Data

US 2011/0161184 A1 Jun. 30, 2011

(51) Int. Cl.
*G06Q 20/00* (2012.01)
*G06Q 30/00* (2012.01)

(52) U.S. Cl. .......................................... 705/16; 705/17

(58) Field of Classification Search ...................... 705/16
See application file for complete search history.

(56) References Cited

U.S. PATENT DOCUMENTS

| 7,720,711 | B2* | 5/2010 | Taylor | 705/16 |
| 7,841,524 | B2* | 11/2010 | Schmidt et al. | 235/383 |
| 2005/0046570 | A1* | 3/2005 | Conzola et al. | 340/568.1 |
| 2009/0152348 | A1* | 6/2009 | Ostrowski et al. | 235/383 |
| 2009/0182638 | A1* | 7/2009 | Taylor | 705/17 |
| 2010/0217678 | A1* | 8/2010 | Goncalves | 705/22 |

* cited by examiner

*Primary Examiner* — Garcia Ade
(74) *Attorney, Agent, or Firm* — Joseph P. Merhle

(57) ABSTRACT

Weight detection mechanisms for cashier checkout terminal are provided. When a transaction by a customer concludes at a cashier checkout terminal, a check is made to determine if a product was left behind on a baggage unit associated with the cashier checkout terminal. When excess weight is detected on the baggage unit at the conclusion of the transaction, one or more alerts are generated to raise awareness with the customer that the product has not been retrieved by the customer from the baggage unit.

20 Claims, 3 Drawing Sheets

WEIGHT DETECTION FOR CASHIER CHECKOUT TERMINALS

BACKGROUND

Increasingly, stores, malls, amusement parks, tourist areas, sporting arenas are becoming very large and geographically dispersed. The small mom and pop stores are dying breeds. This is especially true with the advent of Walmart and the desire of enterprises to compete on the same scale as Walmart. Consequently, most stores sell a huge variety of goods and services to customers and want customers to come to those stores for all their purchasing needs.

In an increasing frenzy to reduce expenses, many enterprises have deployed self-serve checkout kiosks for customers to use to conclude purchases at the enterprises. These kiosks make stores more competitive because fewer store personnel are needed to assist customers checking out of the stores and because customers can exit the stores with their purchases more quickly and are therefore more satisfied with their experience with the stores.

Yet, some customers are still very uncomfortable with the technology associated with self-serve checkouts and still demand to checkout via a cashier lane. Even so, enterprises have sought to reduce staff associated with manning these cashier terminals. This is done by having the cashier perform multiple tasks such as checkout out the customer and bagging the customer's goods into sacks at the checkout area. In some environments, enterprises have attempted to increase cashier productivity by implemented a baggage configuration in a spinning "carrousel" configuration. In other environments, the stores have bags and an area during checkout with a cashier where the customer can bag his/her goods on his/her own.

One problem with this automation is that most customers may have a plurality of purchases they are placed in multiple checkout bags. As a result, customers often leave some bags behind unknowingly. This causes confusion at the store after the customer leaves and the customer may not even realize that something was left behind at all or the customer may not realize it for extended period of time.

In addition, the cashier becomes confused as to who should have the goods left behind or may even inadvertently give goods left behind to a next customer that did not purchase the goods.

SUMMARY

In various embodiments, weight detection mechanisms for cashier checkout terminals are presented. According to an embodiment, a method for detecting weight left behind at a cashier checkout terminal is provided. The conclusion of a transaction at the cashier checkout terminal is detected indicating that payment has been received from a customer. Next, the weight of a product is detected as residing on a baggage unit of a checkout station. Finally, one or more alerts are generated at the checkout terminal and the checkout station to inform a cashier and the customer that the product remains on the baggage unit of the checkout station.

DETAILED DESCRIPTION

Figure 1:
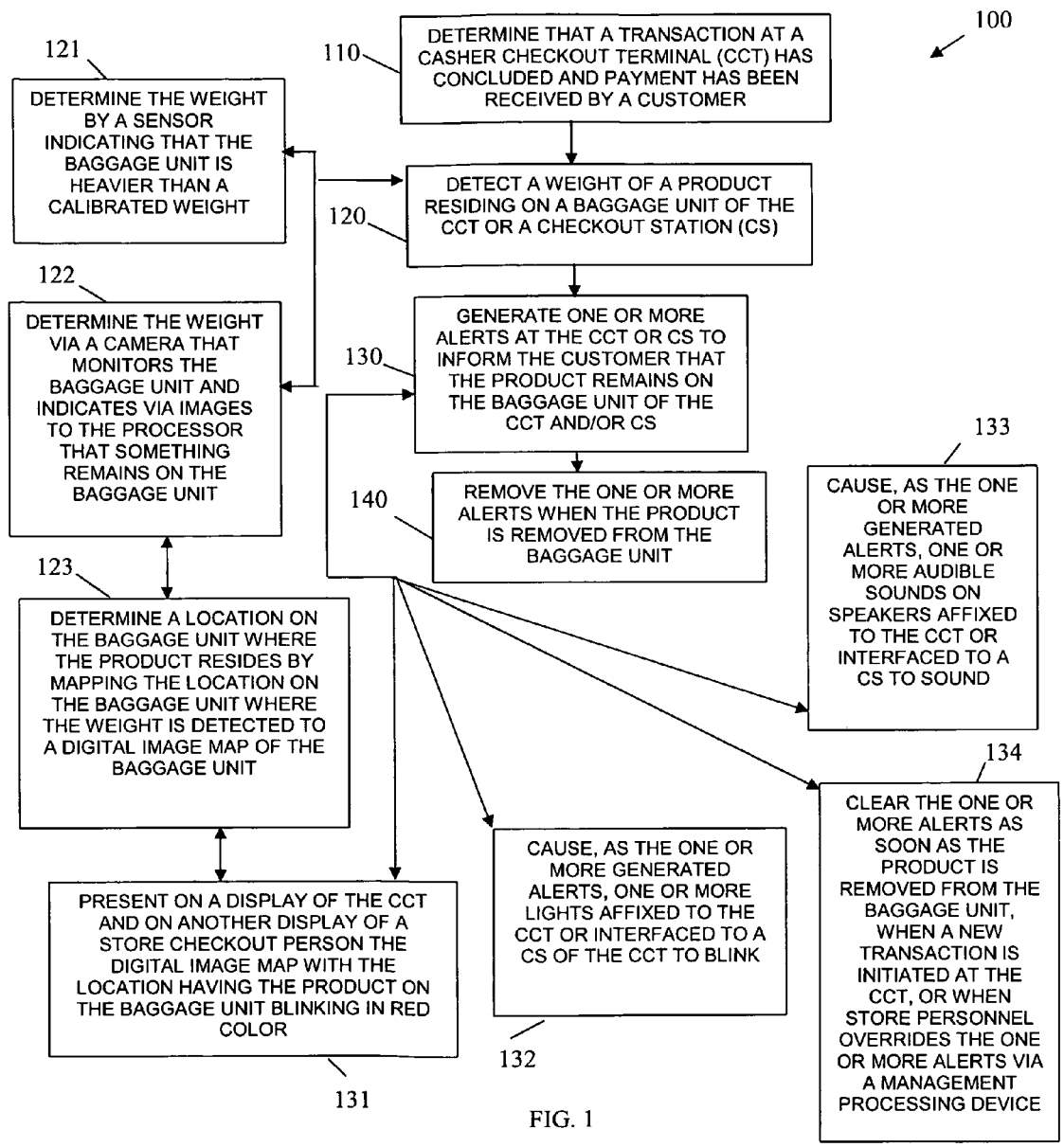
FIG. 1 is a diagram of a method for detecting weight left behind at a cashier checkout terminal, according to an example embodiment.

FIG. 1 is a diagram of a method 100 for detecting weight left behind at a cashier checkout terminal, according to an example embodiment. The method 100 (hereinafter "product detection service") is implemented as instructions residing on a computer-readable storage medium and executed by one or more processors. The processors are specifically configured to process the product detection service. The product detection service operates over a network. The network is wireless, wired, or a combination of wired and wireless.

In an embodiment, the product detection service executes on processors embedded within a cashier checkout terminal. The cashier checkout terminal is located at a store, mall, amusement park, tourist center, and the like. The cashier checkout terminal is part of a checkout station. The checkout station includes the cashier checkout terminal operated by a cashier, a baggage carrousel for holding bags of products acquired at the store (or a baggage unit where bags and products are bagged by a customer), a device to accept payment via credit card or cash, a change dispensing device to dispense cash (bills and/or coins) interfaced to the cashier checkout terminal, a printer for providing receipts (coupons, rebates, etc.), and/or one or more lights, displays, and speakers. Each device of the checkout station includes its own processor and communicates with the processors of the cashier checkout terminal. Moreover, each processor is accessible over a network, such as a Local Area Network (LAN) within the store. In some cases, the LAN may also be accessible over a Wide Area Network (WAN), such as for a credit card device (device to accept payment) to communicate with one or more financial institutions to effect payment for a transaction at the cashier checkout terminal. Security can also be enforced when access to the WAN is provided, such that access to any of the devices can be remotely and securely accessed over the Internet using secure communication protocols and/or encryption.

At 110, the product detection service determines that a transaction at a cashier checkout terminal (operated by a cashier and not a customer that is checking out of a store) has concluded and payment has been received by a customer. That is, a cashier interacts with the cashier checkout terminal via a touch screen (or any other input mechanism) interfaced to the cashier checkout terminal and a dual scanner/produce weighing device (to identify the products being purchased by the customer). The scanner can also be used to identify a loyalty card of the customer and/or to identify coupons or in-store credits. The cashier checks products out and the customer pays for the products via the cashier checkout terminal and utilizing other devices at the checkout station that are interfaced to the cashier checkout terminal. Once payment is received, the product detection service is triggered or notified via an event raised by software processing on the cashier checkout terminal.

At 120, the product detection service detects a weight of a product residing on a baggage unit of the cashier checkout terminal or checkout station.

As used herein a "baggage unit" is the area (such as product conveyor belt, product table, baggage carrousel, etc.) where the consumer obtains goods or products purchased at the cashier checkout station. The baggage unit can include other store personnel that bag products for the customer. Alternatively, the cashier can bag the products and/or the customer. A baggage carrousel can be included as a type of baggage unit. The baggage carrousel spins 360 degrees about a vertical axis and has separate compartments for holding bags.

This can be achieved in a variety of manners.

For example, at 121, the product detection service determines the weight on the baggage unit via a sensor integrated into the baggage unit, the sensor indicates that the baggage unit if heavier than an initial calibrated weight detected at the start of the transaction. So, the sensor can be calibrated to account for the platform and any other fixtures that make of the baggage unit.

In a different scenario, at 122, the product detection service determines that weight exists on the baggage unit via a camera that is affixed at the checkout station to capture images of the sections that comprise the baggage unit. Here, images transmitted of platform of the baggage unit are sent to the processor of the cashier checkout terminal and a location of a product that remains on the baggage unit is mapped to a digital image map of the baggage unit (at 123).

So, in some embodiments, image processing can be used to determine that a product or its weight is on the baggage unit at the conclusion of the transaction made by the customer. The image processing embodiments of 122 and 123 might be an alternative to a weight sensor embodiment by integrating the product detection service into a checkout station using a camera calibrated to monitor the baggage unit along with a software upgrade to the processors of the cashier checkout terminal to provide a fully operational version of the product detection service.

It is noted however that the product detection service can be integrated into some checkout stations via sensors placed into the baggage unit to detect and communicate weight to processors of the cashier checkout terminal when a transaction completes and weight remains on the baggage unit.

At 130, the product detection service generates one or more alerts at the cashier checkout terminal and/or checkout station to inform the customer that the product remains on the baggage unit of the cashier checkout terminal or checkout station. The existence of the weight that remains on the baggage unit or the weight that is implied to reside on the baggage unit via image processing at the conclusion of the transaction causes the product detection service to generate the one or more alerts at the cashier checkout terminal or checkout station.

According to an embodiment, at 131 and continuing with the embodiment of 123, the product detection service presents on a display of the cashier checkout terminal and on another display of a store checkout person the digital map of the baggage unit with the location of the product that remains on the baggage unit blinking in red color or any configured color. This embodiment can also be used with the weight sensor, since the weight sensor may be calibrated to detect a location on the baggage unit where the product weight is occurring. Again, a digital map of the baggage unit can be used to present on the cashier checkout terminal display and on store administrative personnel's display where on the baggage unit the product remains.

In an embodiment, at 132, the product detection service causes, as one or more of the generated alerts, one or more lights affixed to the cashier checkout terminal and/or checkout station to blink or flash. This can be similar to slot machines in casino that encounter a large payout winner or that need servicing, the lights flash so casino personnel and gamblers can see that service is needed at a particular slot machine. Similarly, lights can flash or blink to alert the cashier, customer, and other store personnel that the customer at the cashier checkout terminal is leaving the cashier checkout area without retrieving a product left on the baggage unit.

In another situation, at 133, the product detection service causes, as one or more of the generated alerts, one or more audible sounds on speakers affixed to the cashier checkout terminal and/or checkout station to sound. This may be an alarm sound or a voice telling the customer that a product was left or remains on the baggage unit. It is noted that the embodiments of 132 and 133 are not mutually exclusive, so both embodiments of 132 and 133 can occur at the checkout station simultaneously to further raise awareness in the cashier and/or the customer of the left product remaining on the baggage unit at the conclusion of the transaction.

In a particular case, at 134, the product detection service can clear the one or more alerts: as soon as the product is removed from the baggage unit; when a new transaction is initiated at the cashier checkout terminal; and/or when store personnel overrides the one or more alerts, via a management processing device or console. So, resets can occur by manual override or by some automated action.

It is noted that what is detected as being left on the baggage unit does not have to be a purchased product. That is, a customer may leave a purse, a wallet, a hat, a glove, or any other personal item on the baggage unit and this situation can be detected and generate the alerts as described herein.

Figure 2:
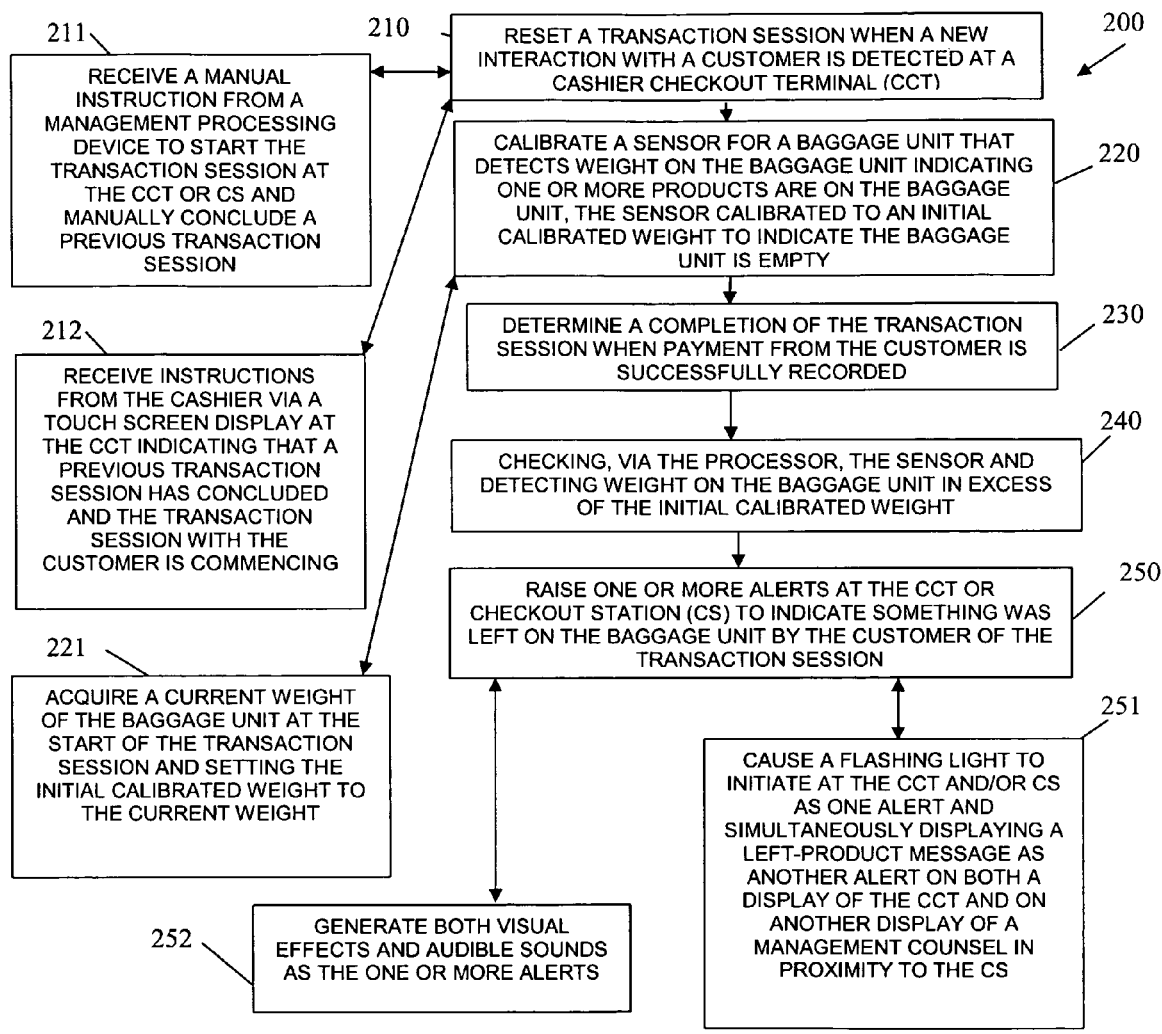
FIG. 2 is a diagram of another method for detecting weight left behind at a cashier checkout terminal, according to an example embodiment.

FIG. 2 is a diagram of another method 200 for detecting weight left behind at a cashier checkout terminal, according to an example embodiment. The method 200 (hereinafter "transaction alert service") is implemented as instruction within a computer-readable storage medium that execute on one or more processors, the processors specifically configured to execute the transaction alert service. The transaction alert service is operational over a network; the network is wired, wireless, or a combination of wired and wireless.

The transaction alert service represents another and in some cases enhanced perspective of the product detection service, presented above with respect to the discussion of the FIG. 1.

At 210, transaction alert service resets a transaction session when a new interaction with a customer is detected at a cashier checkout terminal or checkout station. Here, each transaction between the cashier at the cashier checkout terminal and a customer is a transaction session. As soon as a new transaction session begins, the transaction alert service resets for processing.

According to an embodiment, at 211, the transaction alert service receives a manual instruction from a management processing device or console to start the transaction session at the cashier checkout terminal or checkout station and to manually conclude a previous transaction session. So, a new transaction can be manually generated by store personnel via another processor or processing device interfaced to the cashier checkout terminal.

In another case, at 212, the transaction alert service receives instructions from a cashier via a touch screen display at the cashier checkout terminal indicating that a previous transaction session has concluded and the transaction session with the customer is commencing. So, when a next customer comes to the cashier checkout terminal and the cashier swipes a loyalty card, scans a product bar code, or activates a button on the touch screen, the transaction alert service resets as a new interaction with a customer at the checkout station via the cashier.

At 220, transaction alert service calibrates a sensor for a baggage unit. The sensor detects weight on the baggage unit indicating one or more products are on the baggage unit. The sensor is automatically and dynamically calibrated to an initial calibrated weight to indicate that at this initial calibrated weight the baggage unit is deemed to be empty or without any products remaining on the baggage unit.

According to an embodiment, at 221, the transaction alert service acquires a current weight of the baggage unit at the start of the transaction session and setting the initial calibrated weight to the current weight of the baggage unit. So, if moisture, dust, or even liquids accumulate on the baggage unit over the course of operation, the transaction alert service can use the current weight of the baggage unit at the start of the transaction session as the initial calibrated weight for the baggage unit.

At 230, the transaction alert service determines that the transaction session has completed when payment from the customer is successfully recorded at the cashier checkout terminal or checkout station.

At 240, the transaction alert service checks the sensor when the transaction is deemed completed and compares its weight against the initial calibrated weight for the baggage unit to detect that something was left on the baggage unit. It is noted that some threshold weight beyond the initial calibrated weight may be needed to trigger an event indicating that something remains on the baggage unit. So, existing_weight-_of_baggage_unit may have to be greater than the sum of the initial_calibrated_weight_of_baggage_unit plus threshold weight. The sensitivity of the sensor can also be used to achieve this by ensuring that the sensitivity of the sensor in detecting weight accounts for the threshold.

At 250, the transaction alert service, when excess weight exists on the baggage unit beyond the calibrated weight, raises one or more alerts at the cashier checkout terminal and/or checkout station to indicate that something was left on the baggage unit by the customer of the transaction session after the transaction session concluded.

In an embodiment, at 251, the transaction alert service causes a flashing light to initiate at the cashier checkout terminal and/or checkout station as one alert and simultaneously displays a left-product message as another alert on both a display of the cashier checkout terminal and on another display of a management console in proximity to the checkout station.

In some situations, at 252, the transaction alert service generates both a variety of configurable visual effects and/or a variety of configurable audible sounds or messages as the one or more alerts.

Figure 3:
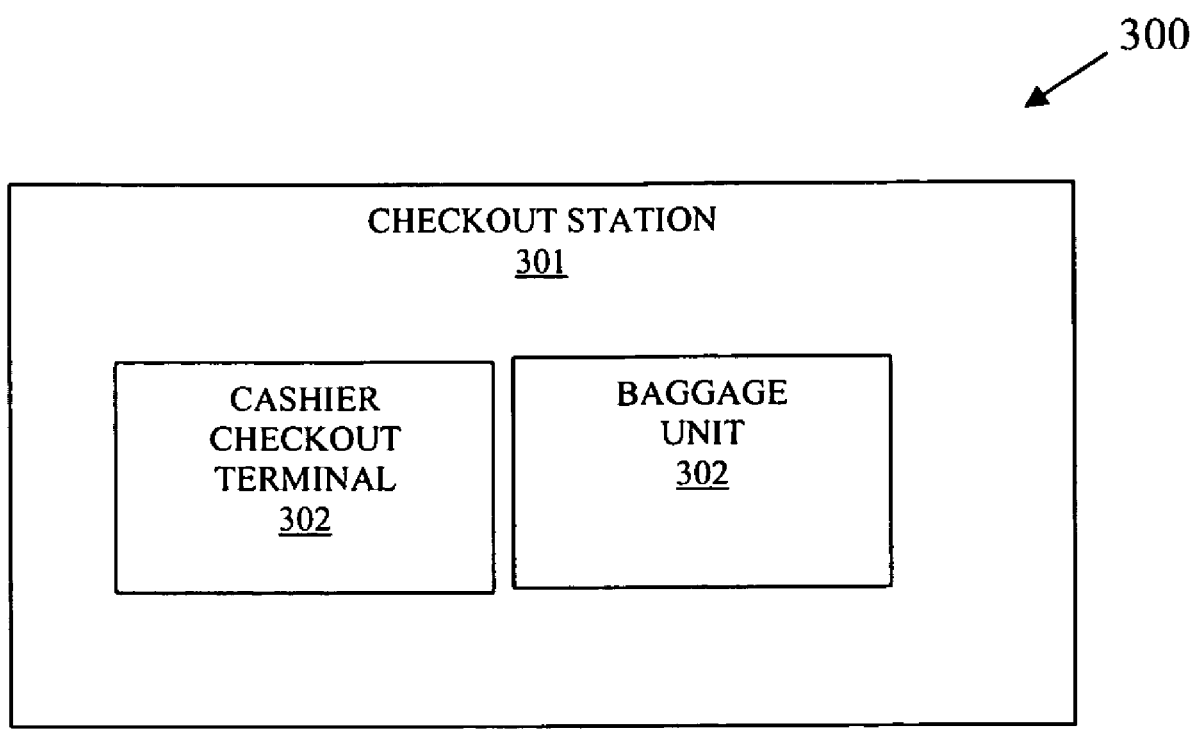
FIG. 3 is a diagram of a cashier checkout weight detection system, according to an example embodiment.

FIG. 3 is a diagram of a cashier checkout weight detection system 300, according to an example embodiment. The cashier checkout weight detection system 300 is implemented as instructions residing in computer-readable storage media and to execute on one or more processors of a network.

The cashier checkout weight detection system 300 implements, inter alia, the methods 100 and 200 of the FIGS. 1 and 2, respectively.

The cashier checkout weight detection system 300 includes a checkout station 301, a cashier checkout terminal 302, and a baggage unit 303. Each of these and their interactions with one another will now be discussed in turn.

The checkout station 301 includes the cashier checkout terminal 302 and the baggage unit 303. The checkout station 301 also includes a payment processing device, a change dispensing device, a printer, one or more speakers, and one or more lights. The checkout station 301 is used as a cashier-directed checkout area for consumers operated by a cashier.

The cashier checkout terminal 302 includes one or more processors having instructions that execute on the processors to perform such things as the methods 100 and 200 of the FIGS. 1 and 2, respectively. The cashier checkout terminal 302 (within the checkout station 301) can be situated at a store, a mall, a tourist center, an amusement park a sports facility, and the like.

The processors of the cashier checkout terminal 302 are configured to interact with a weight detection mechanism that is associated with the baggage unit 303. This is done to detect when a transaction completes on the cashier checkout terminal 302 and when a product remains on the baggage unit 303 at the conclusion of a transaction between the cashier checkout terminal 302 (via a cashier) and a customer. The processors of the cashier checkout terminal 302 are also configured to generate one or more alerts for purposes of raising awareness with a cashier and a customer of the transaction that the product was left behind on the baggage unit 303 at the conclusion of the transaction.

According to an embodiment, the weight detection mechanism is a camera that is configured in cooperation with the processors of the cashier checkout terminal 302 to monitor images on the baggage unit 303 to identify when products are left behind on the baggage unit 303 and thereby implying weight remains on the baggage unit 303 at the conclusion of the transaction with the customer.

In another embodiment, the weight detection mechanism is a weight sensor that is configured in cooperation with the processors of the cashier checkout terminal 302 to detect weight on the baggage unit 303 at the conclusion of the transaction with the customer.

In one situation, at least one of the one or more alerts is a flashing light affixed to the checkout station 301.

In still another case, at least one of the one or more alerts is an audio message configured to be played on speakers interfaced to the cashier checkout terminal 302 and/or checkout station 301.

The baggage unit 303 is integrated into the checkout station 301 and includes processors that interact with the processors of the cashier checkout terminal 302.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method to execute on a processor configured to execute the method, comprising:
   determining, by the processor, that a transaction at a cashier checkout terminal has concluded and payment has been received by a customer;
   detecting, by the processor, a weight of a product residing on a baggage unit of at a checkout station associated with the cashier checkout terminal, the bagging unit is a baggage carrousel that spins 360 degrees; and generating, by the processor, one or more alerts at the checkout station and/or cashier checkout terminal to inform the customer and the cashier that the product remains on the baggage unit, the processor embedded within the cashier checkout terminal that is operated by a cashier on behalf of the customer to perform the transaction.

2. The method of claim 1 further comprising, removing, by the processor, the one or more alerts when the product is removed from the baggage unit.

3. The method of claim 1, wherein detecting further includes determining the weight by a sensor that informs the processor that the baggage unit is heavier than a calibrated weight.

4. The method of claim 1, wherein detecting further includes determining the weight exists, without determining an exact weight, via a camera that monitors the baggage unit and indicates via images to the processor that something remains on the baggage unit.

5. The method of claim 4, wherein detecting further includes determining a location on the baggage unit where the product resides by mapping the location on the baggage unit where the weight is detected to a digital image map of the baggage unit.

6. The method of claim 5, wherein generating further includes presenting on a display of the cashier checkout terminal and on another display of a store administrative person the digital image map with the location having the product on the baggage unit blinking in red color.

7. The method of claim 1, wherein generating further includes causing, as the one or more generated alerts, one or more lights affixed to the cashier checkout terminal or interlaced to the checkout station to blink.

8. The method of claim 1, wherein generating further includes causing, as the one or more generated alerts, one or more audible sounds on speakers affixed to the cashier checkout terminal or interfaced to the checkout station to sound.

9. The method of claim 1, wherein generating further includes clearing the one or more alerts as soon as the product is removed from the baggage unit, when a new transaction is initiated at the cashier checkout terminal, or when store personnel overrides the one or more alerts via a management processing device.

10. A processor-implemented method to execute on a processor configured to execute the method, the method, comprising:

resetting, via the processor, a transaction session when a new interaction with a customer is detected at a cashier terminal, the cashier terminal operated by a cashier on behalf of the customer to perform the transaction session;

calibrating, via the processor, a sensor for a baggage unit that detects weight on the baggage unit indicating one or more products are on the baggage unit, the sensor calibrated to an initial calibrated weight to indicate the baggage unit is empty, the baggage unit is a baggage carrousel that spins 360 degrees;

determining, via the processor, a completion of the transaction session when payment from the customer is successfully recorded;

checking, via the processor, the sensor and detecting weight on the baggage unit in excess of the initial calibrated weight; and raising, via the processor, one or more alerts at the cashier checkout terminal and a checkout station to indicate something was left on the baggage unit by the customer of the transaction session.

11. The method of claim 10, wherein resetting further includes receiving a manual instruction from a management processing device to start the transaction session at the cashier checkout terminal and to manually conclude a previous transaction session.

12. The method of claim 10, wherein resetting further includes receiving instructions from a cashier via a touch screen display of the cashier checkout terminal indicating that a previous transaction session has concluded and the transaction session with the customer is commencing.

13. The method of claim 10, wherein calibrating further includes acquiring a current weight of the baggage unit at the start of the transaction session and setting the initial calibrated weight to the current weight.

14. The method of claim 10, wherein raising further includes causing a flashing light to initiate at the cashier checkout terminal and checkout station as one alert and simultaneously displaying a left-product message as another alert on both a display of the cashier checkout terminal and on another display of a management counsel in proximity to the checkout station.

15. The method of claim 10, wherein raising further includes generating both visual effects and audible sounds as the one or more alerts.

16. A processor implemented system, comprising:
a cashier checkout terminal having one or more processors and interfaced to a network; and
a baggage unit interfaced via one or the one or more processors to the cashier checkout terminal;
the processors configured to interact with a weight detection mechanism associated with the baggage unit to detect when a transaction completes on the cashier checkout terminal and when a product remains on the baggage unit, the processors further configured to generate one or more alerts to cause awareness with a customer of the transaction and a cashier that the product was left behind on the baggage unit at the conclusion of the transaction the processors integrated into the cashier checkout terminal and the transaction operated by a cashier that performs the transaction on behalf of the customer, the baggage unit is a baggage carrousel that spins 360 degrees.

17. The system of claim 16, wherein the weight detection mechanism is a camera that is configured in cooperation with the processors to monitor images on the baggage unit.

18. The system of claim 16, wherein the weight detection mechanism is a weight sensor that is configured in cooperation with the processors to detect weight on the baggage unit.

19. The system of claim 16, wherein at least one of the one or more alerts is a flashing light affixed to the cashier checkout terminal.

20. The system of claim 16, wherein at least one of the one or more alerts is an audio message configured to be played on speakers interfaced to the cashier checkout terminal.

* * * * *